US012044020B2

(12) United States Patent
Olson

(10) Patent No.: US 12,044,020 B2
(45) Date of Patent: Jul. 23, 2024

(54) DEMOLITION SYSTEM

(71) Applicant: VEIT & COMPANY, Rogers, MN (US)

(72) Inventor: Ryan Olson, Maple Lake, MN (US)

(73) Assignee: Veit & Company, Rogers, MN (US)

(*) Notice: Subject to any disclaimer, the term of this patent is extended or adjusted under 35 U.S.C. 154(b) by 541 days.

(21) Appl. No.: 17/394,633

(22) Filed: Aug. 5, 2021

(65) Prior Publication Data

US 2023/0038298 A1 Feb. 9, 2023

(51) Int. Cl.

| | |
|---|---|
| ***E04G 23/08*** | (2006.01) |
| ***B08B 15/00*** | (2006.01) |
| ***E02F 3/413*** | (2006.01) |
| ***E02F 9/08*** | (2006.01) |
| ***E02F 9/20*** | (2006.01) |

(52) U.S. Cl.

CPC .............. *E04G 23/08* (2013.01); *B08B 15/00* (2013.01); *E02F 3/4135* (2013.01); *E02F 9/085* (2013.01); *E02F 9/205* (2013.01); *E04G 2023/087* (2013.01)

(58) Field of Classification Search

CPC ......... E02F 3/4135; E02F 9/085; E02F 9/205; E04G 23/08; E04G 2023/087; B08B 15/00

See application file for complete search history.

(56) References Cited

U.S. PATENT DOCUMENTS

| | | | | |
|---|---|---|---|---|
| 3,436,120 | A * | 4/1969 | Armstrong | E04G 23/08 182/128 |
| 4,955,457 | A | 9/1990 | Pohl et al. | |
| 5,273,217 | A * | 12/1993 | Bartels | E04G 23/08 241/266 |
| 5,711,022 | A * | 1/1998 | Steenwyk | E04G 23/08 701/50 |
| 9,279,262 | B2 | 3/2016 | Perdue | |
| 10,890,003 | B2 * | 1/2021 | Gardner | E04G 23/08 |
| 2022/0401986 | A1 * | 12/2022 | Andersson | E04G 23/08 |

FOREIGN PATENT DOCUMENTS

| | | |
|---|---|---|
| DE | 3512212 | 10/1986 |
| FR | 2859231 | 3/2005 |
| JP | 2009256930 | 11/2009 |
| JP | 2018150673 | 9/2018 |

* cited by examiner

*Primary Examiner* — Seahee Hong
(74) *Attorney, Agent, or Firm* — Mueting Raasch Group

(57) ABSTRACT

A demolition system includes a frame, a plurality of outriggers, a demolition apparatus, and a water reservoir. The frame includes a frame base, a plurality of support members coupled to the frame base, a platform coupled to the plurality of support members, and one or more lifting ears extending from the platform. The plurality of outriggers are coupled to the frame base. The demolition apparatus is coupled to and supported by the frame base. The demolition apparatus includes a main body rotatably coupled to the frame base, an arm extending from the main body between two of the plurality of support members, one or more gripping members coupled to the arm, and a motor configured to selectively rotate the main body relative to the frame base. The water reservoir is coupled to and supported by the platform of the frame. Additionally, the water reservoir provides water to the demolition apparatus.

20 Claims, 5 Drawing Sheets

DEMOLITION SYSTEM

The present invention relates to a demolition system, in particular an industrial chimney stack demolition system, with a frame, a plurality of outriggers, a demolition apparatus, and a water reservoir. The water reservoir is configured to provide water to the demolition apparatus.

Demolition systems may be used to demolish structures including, for example, industrial chimney stacks. Such demolition systems may rely on the structure to be demolished to support the weight of the demolition system. Furthermore, demolition systems may allow dust and debris to become airborne and propagate through the air spreading the dust and debris far from the demolition site or zone.

It would be desirable to have demolition system that does not rely on the structure to be demolished to support a weight of the demolition system. Moreover, it would be desirable to provide a demolition system that includes means for preventing the propagation of dust and debris from the demolition site. It would be further desirable to have a demolition system that can accommodate a wide range of structure or stack diameters.

According to the invention a demolition system includes a frame, a plurality of outriggers, a demolition apparatus, and a water reservoir. The frame includes a frame base, a plurality of support members coupled to the frame base, a platform coupled of the plurality of support members, and one or more lifting ears extending from the platform. Two support members of the plurality of support members define an angle of rotation of a rotation zone. The platform is supported above the frame base by the plurality of support members. Each of the one or more lifting ears includes one or more lifting points and the one or more lifting ears are configured to support a weight of the system when the system is lifted via the one or more lifting ears. The plurality of outriggers are coupled to the frame base. The demolition apparatus is coupled to and supported by the frame base of the platform. The demolition apparatus includes a main body rotatably coupled to the frame base, an arm extending from the main body between the two support members, one or more gripping members coupled to an end of the arm, and a motor. The arm is moveable within the rotation zone and the rotation zone is defined by the angle of rotation and a maximum extension length of the arm. The motor is configured to selectively rotate the main body relative to the frame base. The water reservoir is coupled to and supported by the platform of the frame. The water reservoir includes a storage volume configured to hold water, is in fluid communication with the demolition apparatus, and configured provide the water to the demolition apparatus.

Preferably, the water reservoir is configured to passively provide water to the demolition apparatus. In other words, water provided by the water reservoir to the demolition apparatus is gravity fed without the use of a pump. The system may include a tube configured to convey water from the water reservoir to the demolition apparatus. Preferably, the water reservoir includes a housing defining the storage volume. The housing may be at least partially transparent or semitransparent. A water level of the storage volume may be visible through the housing. The water reservoir may be configured to hold at least 275 gallons of water. Advantageously, water can be provided to the demolition apparatus from the reservoir without pumping water from ground level.

Preferably, the demolition apparatus includes a spray nozzle coupled to the arm. The spray nozzle may emit water in a spray pattern configured to mitigate the propagation of dust and debris in air. The spray pattern may be a conical spray, a flat fan spray, or a misting spray. The spray nozzle may emit water in the general direction of the gripping members to knock down dust and debris in the air resulting from demolition of a structure by the gripping members. The demolition apparatus may be configured to pump water to the spray nozzle. Water received from the water reservoir may be received a the main body of the demolition apparatus and such water may be pumped to the spray nozzle via a tube using the pump of the demolition apparatus.

Preferably, the plurality of outriggers includes two movable outriggers configured to extend and retract. Movable outriggers may include a stationary member and a movable member. The stationary member may be coupled to the frame of the demolition system and remain stationary relative to the frame. In contrast, the movable member of the movable outriggers may be movably coupled to the stationary member. The movable member may extend at least partially into the stationary member. As the movable member is extended, the portion of the movable member that resides inside the stationary member may decrease. Conversely, as the movable member is retracted, the portion of the movable member that resides inside the stationary member may increase. Movement of the movable member may be facilitated by a motor. For example, the motor of the demolition apparatus may be configured to extend or retract the two movable outriggers. Each of the two movable outriggers may include a hydraulic motor that is controllable by the motor of the demolition apparatus.

Additionally, the two movable outiggers may be configured to retract in response to the demolition system losing power. In one or more embodiments, the demolition system may include a pump operatively coupled to the two movable outriggers and configured to retract the two outriggers in response to the demolition system losing power. The pump may be operatively coupled to a timer. The timer may allow the pump to run for a predetermined time period to allow the two outriggers to retract and disengage from walls of the structure. The predetermined time period may between about 1 minute and 3 minutes. In one or more embodiments, the predetermined time period is 2 minutes. The pump may be operatively coupled to a pressure sensor. The pressure sensor may sense a pressure of the two movable outriggers and provide a sensor signal based on the sensed pressure. Such pressure signal may be used to determine whether to activate or deactivate the pump. In one or more embodiments, the two movable outriggers may include an accumulator valve configured to allow the movable outrigger to retract in response to the demolition system losing power. Such retraction of the two movable outriggers may allow easier movement of the demolition system (e.g., allow a crane to move the demolition system more freely) if, for some reason, the demolition system loses power.

The plurality of outriggers may include two extendable outriggers each configured to couple to outrigger extensions. The outrigger extensions may couple to one of the two extendable outriggers or to another outrigger extension. Multiple outrigger extensions may be coupled together and to an extendable outrigger to provide an extendable outrigger of any suitable length. Accordingly, the length of the extendable outriggers may be adjusted to various lengths as based on the dimensions of a given structure. Adjustments to the length of an extendable outrigger may include an increase in the length of the extendable outrigger or a decrease in the length of the extendable outrigger. To extend the length of the extendable outriggers, additional outrigger extensions may be added or coupled to the extendable outriggers. To decrease the length of the extendable outriggers, outrigger extensions may be removed from the extendable outriggers.

The plurality of outriggers may be configured to engage with one or more walls of a structure and remain stationary while engaged to the one or more walls while the demolition apparatus rotates. In other words, the outriggers may form an interference fit with one or more walls of a structure to prevent the frame from rotating while the demolition apparatus is free to rotate within the rotation zone. The outriggers may be configured to support the weight of the demolition system when the outriggers are engaged with one or more walls. In one or more embodiments, the outriggers are configured to support a load of at least 25,000 pounds. The outriggers may define a minimum inner diameter that the demolition apparatus can fit into. In one or more embodiments, the minimum inner diameter is 8.5 feet. Additionally, the outriggers may be arranged to extend or move in any suitable direction. In one or more embodiments, the outriggers may be arranged parallel to one another. In other embodiments, the outriggers may be arranged at an angle from the forward direction (e.g., the direction the arm faces when at the center of the angle of rotation).

Preferably, the demolitions system includes a receiver configured to receive commands from an external control system. The receiver may include any suitable hardware such as, for example, antennas, ethernet ports, audio/visual outputs, coaxial cable outputs, or other communication apparatus. The receiver may be configured to receive commands using any suitable wired or wireless protocol such as, for example, WiFi, Bluetooth, Near Field Communication (NFC), Controller Area Network (CAN), Local Area Network (LAN) protocols, or other protocols. Received commands may include instructions to, for example, move the arm in within the rotation zone, move the gripping members, adjust one or more extendable outriggers, spray water, adjust imaging devices, or other suitable instructions. Movement of various components may include rotating, extending, retracting, etc. An external control system may include, for example, a control station, a mobile compute device, a radio controller, or other suitable control systems.

Preferably, the demolition system includes a transmitter configured to transmit system data of the system to an external computing device. The transmitter may include any suitable hardware such as, for example, antennas, ethernet ports, audio/visual outputs, coaxial cable outputs, or other communication apparatus. The transmitter may be configured to transmit data using any suitable wired or wireless protocol such as, for example, WiFi, Bluetooth, Near Field Communication (NFC), Controller Area Network (CAN), Local Area Network (LAN) protocols, or other protocols. System data may include, for example, system status information, sensor data, image data, or other data or information regarding the demolition system.

Although the transmitter and receiver are described separately the transmitter and receiver may be included in a single device such as, for example, a transceiver. Furthermore, the demolition system may include any number of transmitters, receivers, or transceivers configured to communicate with various systems to in order to facilitate a demolition process such as, for example, demolition of an industrial chimney stack.

Preferably, the demolition system includes one or more imaging devices configured to capture images within a demolition zone (e.g., the structure to be demolished and an area in proximity to the structure). Imaging devices may include any suitable device or devices for capturing images or video. Such imaging devices may include, for example, cameras, video cameras, image sensors, optical sensors, or other devices capable of capturing images or video. Each of the imaging devices may further include one or more receivers, memories, transmitters, receivers, controllers, sensors, etc. The receivers may be configured to capture audio of the demolition zone. Memories may be configured to save or buffer images and video. The transmitters and receivers may be configured to receive and transmit data or commands. The controllers may be configured to, for example, process audio data, process image or video data, receive sensor data, move the imaging devices, etc. The sensors may include, for example, light intensity sensors, infrared sensors, night vision sensors, etc.

Each of the imaging devices may be assigned to a portion of the demolition zone. For example, at least one imaging device may be configured to capture images within the rotation zone. Such imaging device may provide a constant visual of the arm of the demolition apparatus. Other imaging devices may be configured to capture image in areas where the outriggers are located. The imaging devices may transmit images or video to a user. Such images may be provided to a user via, for example, a control station, a mobile compute device, a tablet, a computer, or other computing device. Accordingly, a user may monitor the demolition zone and the demolition apparatus while a structure is being demolished. Images and sound captured by the imaging devices may be transmitted via wired or wireless connections. In one or more embodiments, the demolition system includes an audio-visual cord. The audio-visual cord may be operatively coupled to the imaging devices to transmit audio and video captured by the imaging devices. The demolition system may further include an extendable tail coupled to the platform and configured to hold the audio-visual cord away from structures within the demolition zone. The extendable tail may be extended or retracted using the motor of the demolition apparatus. The motor of the demolition apparatus may be configured to control a hydraulic motor of the extendable tail to extend and retract the extendable tail.

Preferably, the lifting ears are configured to be coupled to a crane or boom to allow the crane to lift or support the demolition system. The demolition system may have a weight of at least 17,000 pounds when the water reservoir is empty. Accordingly, the lifting ears may be configured to support a weight of at least 17,000 pounds and the weight of any water in the water reservoir (e.g., 2,295 pounds or 275 gallons). In one or more embodiments, in the one or more lifting ears are configured to support a load of at least 25,000 pounds. The lifting ears may have a thickness of at least 1 inch. Each lifting point of the lifting ears may be configured to engage with and couple to a crane. In one or more embodiments, each of the one or more lifting points includes a through-hole extending through one of the one or more lifting ears. The through-holes may have a diameter of at least 1.5 inches.

The angle of rotation may refer to the angle at a front of the frame that that the arm or the demolition apparatus is free to rotate in. Preferably, the angle of rotation is greater than or equal to 60 degrees and less than or equal to 180 degrees. In one or more embodiments, the angle of rotation is 69 degrees.

Preferably, the platform overhangs and extends beyond the frame base in at least one direction. In one or more embodiments, the platform extends beyond the frame base in the direction of the center of the rotation zone.

Preferably, the demolition system further includes a plurality of pins configured to couple the plurality of support members to the frame base or platform. Each of the plurality of pins may be removable. The support members may be separable from the frame base and the platform when the plurality of pins are removed. Each of the frame base and the platform may include receptacles each configured to receive an end of a support member. When the ends of the support members are received in the receptacles the pins may be inserted through walls of the receptacle and the support members to secure the support members in the receptacles.

Preferably, the demolition system can be lifted with a crane or boom.

Terms such as “front”, “rear”, “top”, “bottom”, “side”, “upper”, “lower”, “height”, “width”, “depth” and other terms used to describe relative positions of the components of the demolition system according to the invention refer to the demolition system in an upright position with the platform overhanging the frame base.

The words “preferred” and “preferably” refer to embodiments of the invention that may afford certain benefits, under certain circumstances. However, other embodiments may also be preferred, under the same or other circumstances. Furthermore, the recitation of one or more preferred embodiments does not imply that other embodiments are not useful and is not intended to exclude other embodiments from the scope of the disclosure, including the claims.

The invention is defined in the claims. However, below there is provided a non-exhaustive listing of non-limiting examples. Any one or more of the features of these examples may be combined with any one or more features of another example, embodiment, or aspect described herein.

Example Ex1. A demolition system including a frame, a plurality of outriggers, a demolition apparatus, and a water reservoir. The frame includes a frame base, a plurality of support members coupled to the frame base, a platform coupled to the plurality of support members, and one or more lifting ears extending from the platform. Two support members of the plurality of support members define an angle of rotation of a rotation zone. The platform is supported above the frame base by the plurality of support members. Each of the one or more lifting ears includes one or more lifting points, wherein the one or more lifting ears are configured to support a weight of the system when the system is lifted via the one or more lifting ears. The demolition apparatus is coupled to and supported by the frame base of the platform. The demolition apparatus includes a main body rotatably coupled to the frame base, an arm extending from the main body between the two support members and moveable within the rotation zone, one or more gripping members coupled to an end of the arm, and a motor. The rotation zone is defined by the angle of rotation and a maximum extension length of the arm. The motor is configured to selectively rotate the main body relative to the frame base. The water reservoir is coupled to and supported by the platform of the frame. The water reservoir includes a storage volume configured to hold water, wherein the water reservoir is in fluid communication with the demolition apparatus, and wherein the water reservoir is configured provide the water to the demolition apparatus.

Example Ex2. The system of Ex1, wherein the water reservoir is configured to passively provide water to the demolition apparatus.

Example Ex3. The system of Ex1, wherein the demolition apparatus further includes a spray nozzle coupled to the arm and a pump configured to pump water to the spray nozzle.

Example Ex4. The system of Ex1, further including a tube configured to convey water from the water reservoir to the demolition apparatus.

Example Ex5. The system of Ex1, wherein the water reservoir includes a housing defining the storage volume, and wherein the housing is at least partially transparent or semitransparent.

Example Ex6. The system of Ex1, wherein the plurality of outriggers includes two movable outriggers configured to extend and retract.

Example Ex7. The system of Ex6, wherein the motor of the demolition apparatus is further configured to extend or retract the two movable outriggers.

Example Ex8. The system of Ex6, wherein each of the two movable outriggers includes a hydraulic motor.

Example Ex9. The system of Ex8, wherein each of the two movable outriggers are configured to retract in response to the demolition system losing power.

Example, Ex10. The system of Ex8, further comprising a pump configured to retract the two movable outriggers in response to the demolition system losing power.

Example Ex11. The system of claim Ex8, wherein each of the two movable outriggers include an accumulator valve configured to allow the movable outrigger to retract in response to the demolition system losing power.

Example Ex12. The system of Ex1, wherein the plurality of outriggers includes to extendable outriggers configured to couple to outrigger extensions.

Example Ex13. The system of Ex1, wherein the plurality of outriggers are configured to engage with one or more walls and remain stationary while engaged to the one or more walls while the demolition apparatus rotates.

Example Ex14. The system of Ex1, further including a receiver configured to receive commands from an external control system.

Example Ex15. The system of Ex1, further including a transmitter configured to transmit system data of the system to an external computing device.

Example Ex16. The system of Ex1, further including one or more imaging devices configured to capture images within a demolition zone.

Example Ex17. The system of Ex14, wherein at least one imaging device of the one or more imaging devices is configured to capture images within the rotation zone.

Example Ex18. The system of Ex1, wherein the one or more lifting points include a through-hole extending through one of the one or more lifting ears.

Example Ex19. The system of Ex1, wherein the one or more lifting ears are configured to support a load of at least 25,000 pounds.

Example Ex20. The system of Ex1, wherein the outriggers are configured to support a load of at least 25,000 pounds.

Example Ex21. The system of Ex1, wherein the angle of rotation is greater than or equal to 90 degrees and less than or equal to 180 degrees.

Example Ex22. The system of Ex1, wherein the platform overhangs and extends beyond the frame base in at least one direction.

Example Ex23. The system of Ex1, further including an audio-visual cord and an extendable tail coupled to the platform configured to hold the audio-visual cord away from structures within a demolition zone.

Example Ex24. The system of Ex1, further including a plurality of pins configured to couple the plurality of support members to the frame base or platform, wherein each of the plurality of pins are removable and the support members are separable from the frame base and the platform when the plurality of pins are removed.

Example Ex25. A method comprising lifting any one of the systems of Ex1 to Ex21 using a boom.

Example Ex26. A method for demoliting a structure including picking up a demolition system using a crane; moving the demolition system in proximity to a structure using the crane 200; extending the movable outriggers to engage the structure using a motor of a demolition apparatus of the demolition system; positioning gripping members around a portion of the structure; removing a portion of the structure using the gripping members; and spraying airborne dust and debris with water using a spray nozzle operatively coupled to the demolition apparatus.

Example Ex27: The method of Ex 24, further including turning the demolition system to face another portion of the structure.

The invention will be further described, by way of example only, with reference to the accompanying drawings in which.

Figure 1:
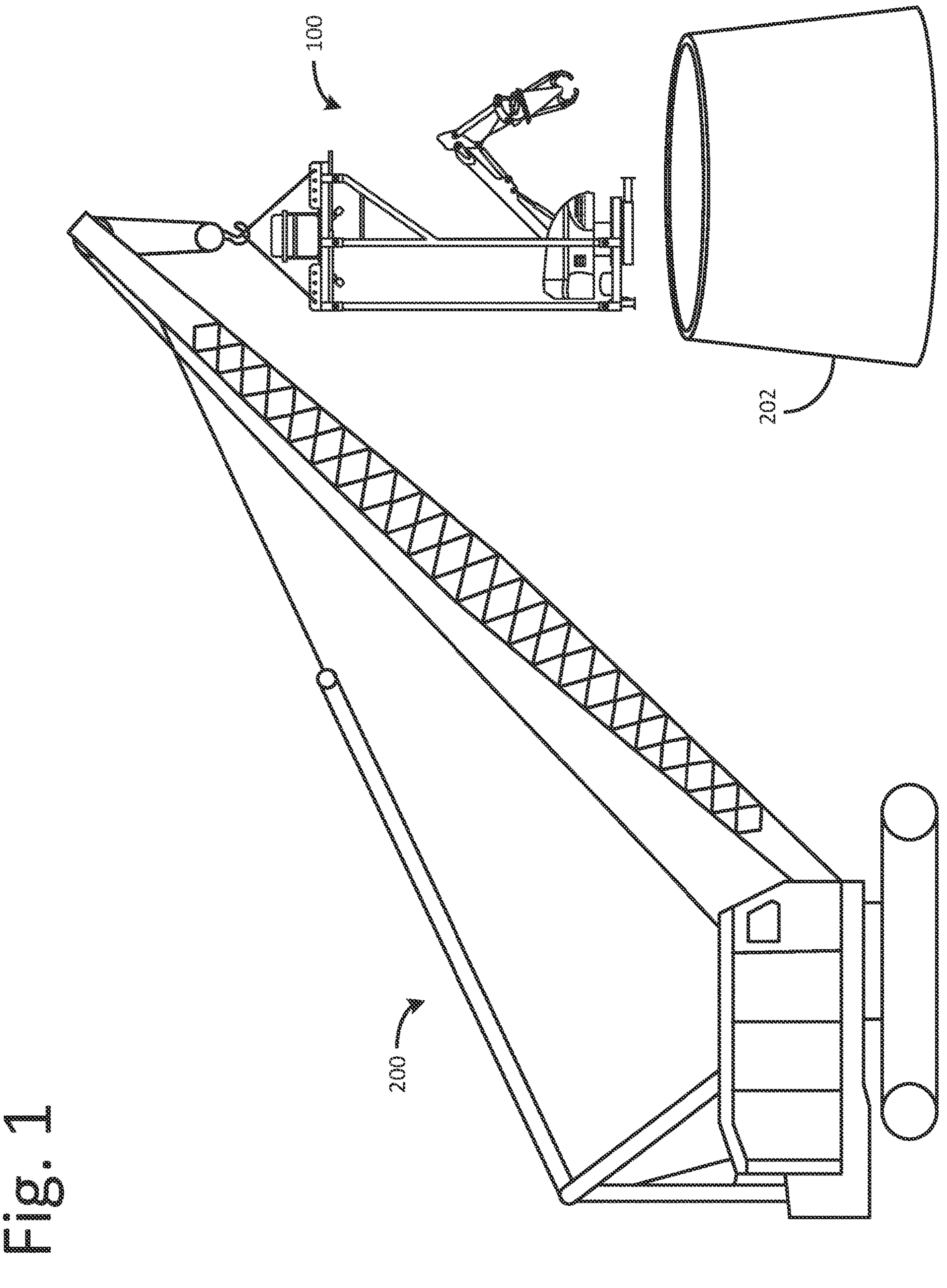
FIG. 1 shows a demolition system being used to demolish a structure according to embodiments described herein.

FIG. 1 is illustrates a demolition system 100 being used to demolish a structure 202. The demolition system 100 is being lifted by a crane 200 above the structure 202. The demolition system 100 may be lowered by the crane 200 at least partially into the structure 202 where the demolition system can interact with and ultimately demolish the structure 202. As shown, the structure 202 is an industrial chimney stack. However, the demolition system 100 as described herein, may be used to demolish any suitable structure.

Figure 2:
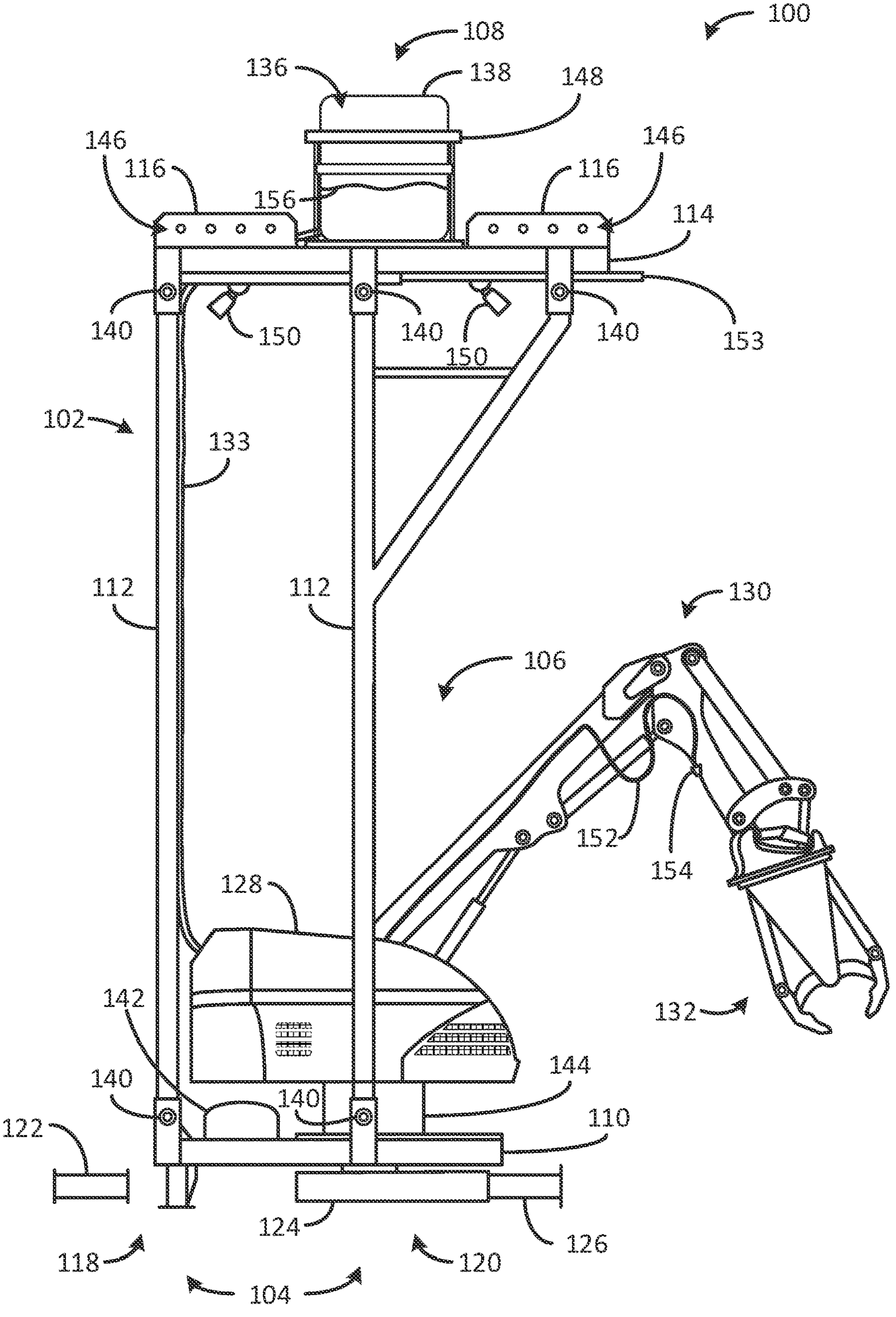
FIG. 2 shows a side view of the demolition system of FIG. 1 according to embodiments described herein.
Figure 3:
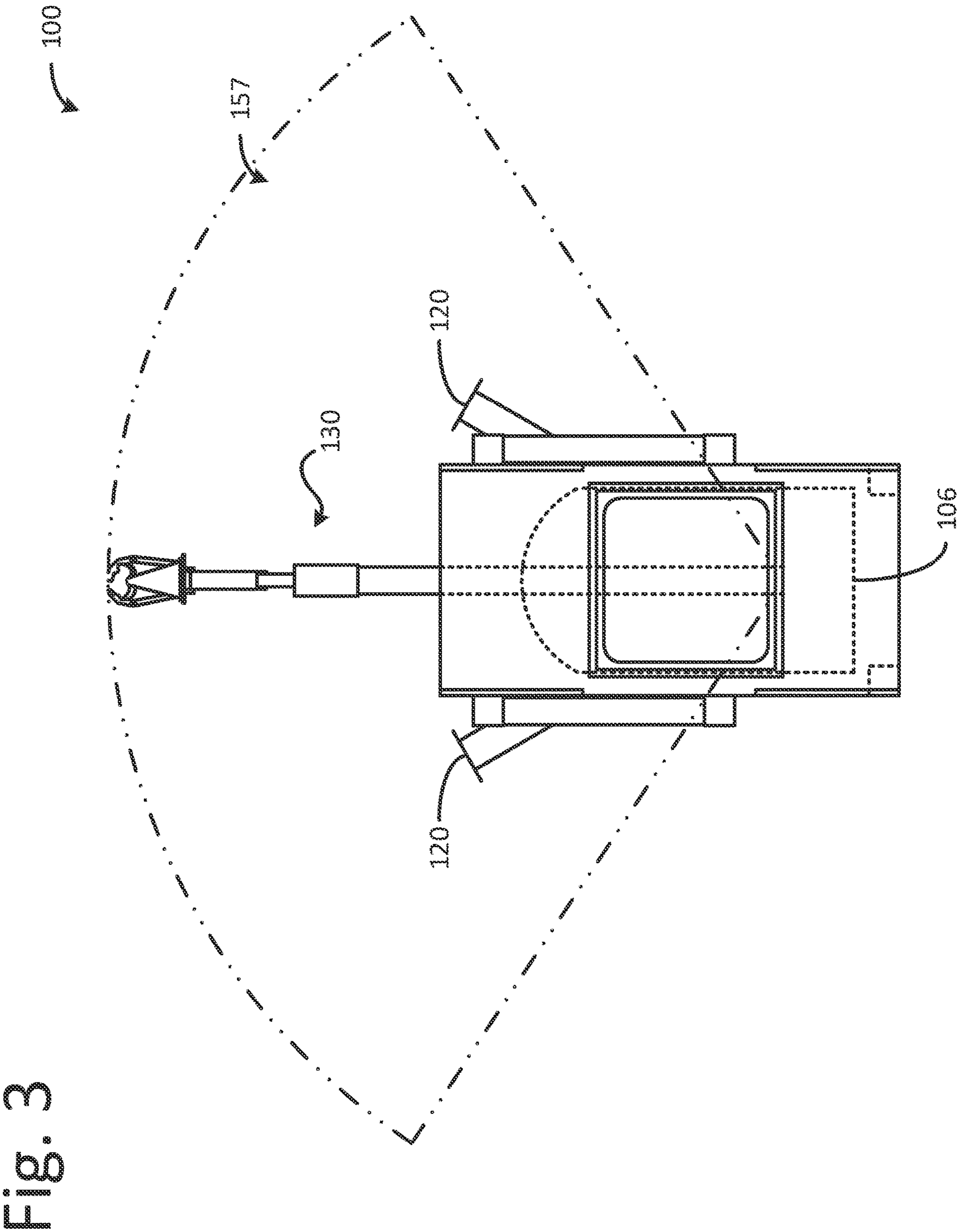
FIG. 3 shows a top down view of the demolition system of FIGS. 1 and 2 according to embodiments described herein.

FIGS. 2 and 3 depict an embodiment of the demolition system 100. In FIG. 2 the demolition system 100 is shown from the side and in FIG. 3 the demolition system 100 is shown from above. The demolition system 100 includes a frame 102, outriggers 104, a demolition apparatus 106, and a water reservoir 108.

The frame 102 includes a frame base 110, support members 112, a platform 114, and lifting ears 116. The support members 112 may be coupled to the frame base 110 and the platform 114. The frame 102 may include pins 140 to couple the support members to the frame base 110 and the platform 114. The support members 112 may support the platform 114 over the frame base 110. The water reservoir 108 may be supported by the platform 114. The lifting ears 116 may be coupled to the platform 114. Each of the lifting ears 116 may include lifting points 146. Lifting points 146 may include one or more of through-holes, eye bolts, eye nuts, lifting eyes, pad eyes, hoist rings, etc. The lifting ears 116 may be configured to support a weight of the demolition system 100 when lifted by the lifting ears 116. In one or more embodiments, the lifting ears 116 may be configured to support 25,000 pounds. The frame may further include retention member 148 configured to retain or couple to the water reservoir 108 to the platform 114. The retention member 148 may prevent the water reservoir 108 from moving or sliding on the platform 114. The retention member 148 may include, for example, a cage, bars, locks, latches, etc.

The outriggers 104 are coupled to the frame base 110. The outriggers 104 may include an extendable outrigger 118 and a movable outrigger 120. The extendable outrigger 118 may be coupled to an outrigger extension 122 to extend the length of the extendable outrigger 118. Additional or larger outrigger extensions may be coupled to extendable outrigger 118 to further extend its length. Although only one extendable outrigger 118 is shown, the demolition system may include any suitable number of extendable outriggers 118. Movable outrigger 120 may include a stationary member 124 and a movable member 126. The movable member 126 may be moved relative to the stationary member 124 to increase or decrease the length of the movable outrigger 120. The movable member 126 may at least partially retract into the stationary member 124 when the length of the movable outrigger 120 is decreased. Conversely, a greater portion of the movable member 126 may reside outside of the stationary member 124 when the length of the movable outrigger 120 is increased. The movable outrigger 120 may include a hydraulic motor configured to extend and retract the movable member 126. Additionally, the movable outrigger 120 may be configured to retract in response to the demolition system 100 losing power. In one or more embodiments, the demolition system 100 may include an outrigger pump configured to retract the movable outrigger 120 if the demolition system 100 loses power. In one or more embodiments, the movable outrigger 120 may include an accumulator valve configured to allow the movable outrigger 120 to retract if the demolition system 100 loses power.

Figure 4:
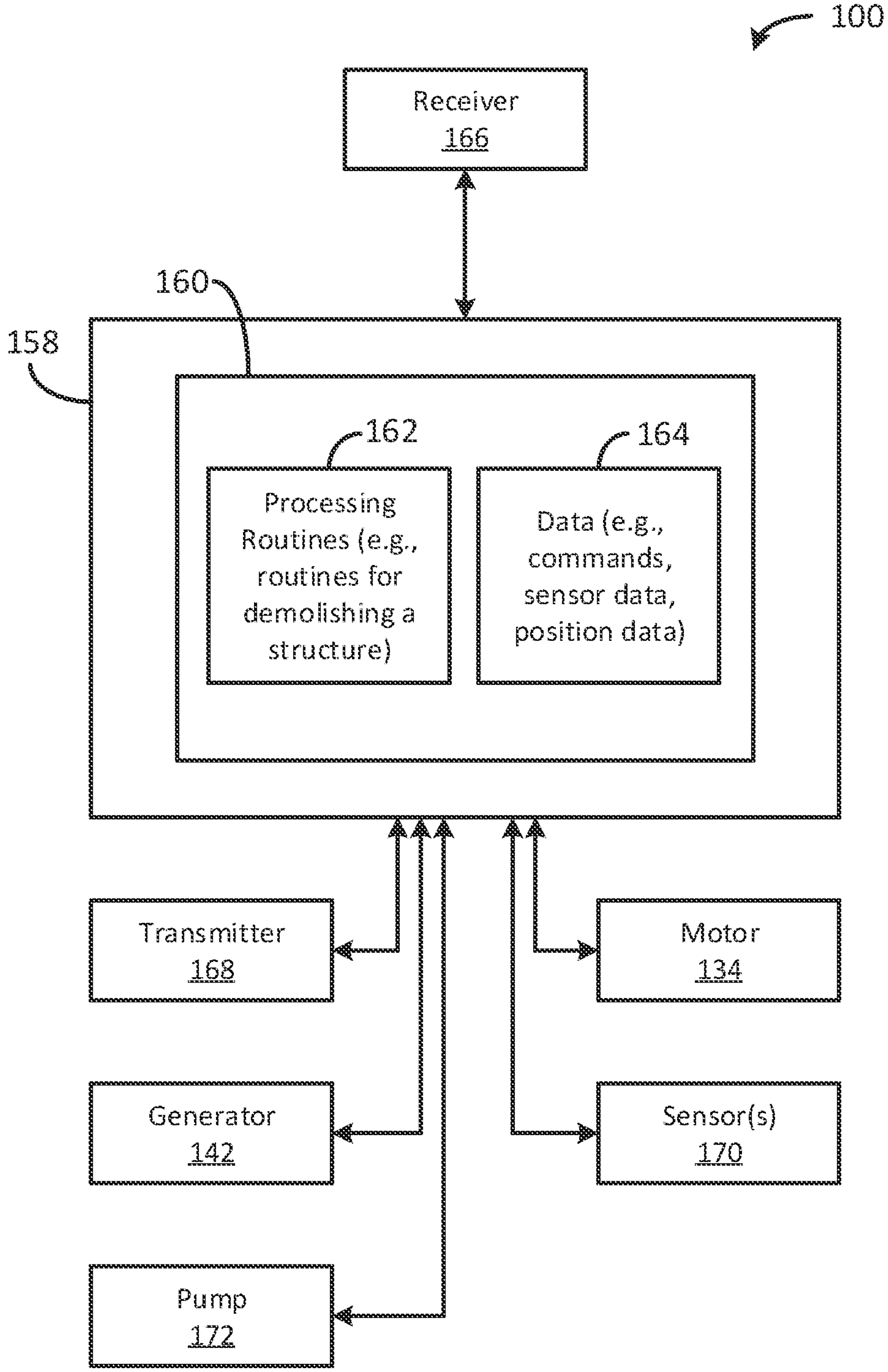
FIG. 4 shows a schematic block diagram of a portion of the demolition system according to embodiments described herein.

The demolition apparatus 106 includes a main body 128, an arm 130, gripping members 132, and a motor 134 (see FIG. 4). Although not depicted in FIGS. 2 and 3, the motor 134 of the demolition apparatus 106 may be housed inside the main body 128. The demolition apparatus 106 may be rotatably coupled to the frame base 110 by a pedestal 144. The motor 134 may be configured to rotate the main body 128 relative to the frame base 110. The arm 130 extends from the main body between two of the support members 112. The two support members 112 may define the angle of rotation. The gripping members 132 are coupled to the arm 130. The motor 134 may be configured to move the arm 130 and the gripping members 132. The demolition apparatus may further include tube 152 and spray nozzle 154. The spray nozzle 154 may configured to emit water in a spray pattern to prevent the movement of dust and debris from propagating through the air. Such water may be provided by the water reservoir 108.

The water reservoir 108 includes a storage volume 136 defined by a housing 138. The storage volume 136 may be configure to hold water. The housing 138 may be transparent or semitransparent such that a water level 156 of the water within the storage volume 136 may be visible from the outside. As shown, the water reservoir 108 is in fluid communication with the demolition apparatus 106 via a supply tube 133. The supply tube 133 may allow water to be passively provided from the water reservoir 108 to the demolition apparatus 106. In other words, water may be gravity fed from the water reservoir 108 to the demolition apparatus 106. Accordingly, the demolition apparatus 106 may pump water received from the water reservoir 108 through the tube 152 and out of the spray nozzle 154.

The demolition system may further include a generator 142 and imaging devices 150. The generator 142 may be configured to generate power and provide such power to the imaging devices. The imaging devices 150 may be configured to capture images and/or video of a demolition zone. The demolition zone may include, for example, the demolition system 100, the structure to be demolished (e.g., structure 202 of FIG. 1), and the area in proximity to such structure. The imaging devices 150 may be operatively coupled to an external display or computing system with a display via a wired or wireless connection. Such wired or wireless connection may allow images and/or video captured by the imaging devices 150 to be displayed to a user on the external display or computing system.

FIG. 4 shows a schematic system block diagram of portion of demolition system 100. The demolition system 100 may include a processing apparatus or processor 158 and a receiver 166. Generally, the receiver 166 may be operatively coupled to the processing apparatus 158 and may include any one or more devices configured to receive data and provide the data to the processing apparatus 158. The receiver 166 may be configured to receive the data from a control station, mobile compute device, tablet, radio controller, etc. The receiver 166 may include any apparatus, structure, or device configured to receive wired or wireless signals. For example, the receiver 166 may include one or more antennas, crystals, ports, application-specific integrated circuits (ASICs), analog-to-digital converters, etc.

Data received by the receiver 166 may be provided to the processing apparatus 158, e.g., such that the processing apparatus 158 may analyze, modify, store, and/or transmit the data. Further, such data may include commands that are provided to the processing apparatus 158 to be carried out. For example, a command to rotate the demolition apparatus may be received by the receiver 166 and provided to the processing apparatus 158. In response, the processing apparatus 158 may use the motor 134 to rotate the demolition apparatus 106. Further, such data may be provided to the processing apparatus 158 in a variety of different ways. For example, the commands or data may be transferred to the processing apparatus 158 through a wired or wireless data connection between the processing apparatus 158 and the receiver 166.

The demolition system 100 may additionally include a transmitter 168 operatively coupled to the processing apparatus 158. The transmitter 168 may be configured to transmit data received from the processing apparatus 158 to an external device. The external device may include, for example, a control station, mobile compute device, tablet, radio controller, etc. The transmitter 168 may include any apparatus, structure, or device configured to transmit wired or wireless signals. For example, the transmitter 168 may include one or more antennas, crystals, ports, application-specific integrated circuits (ASICs), digital-to-analog converters, etc.

The demolition system 100 may additionally include a generator 142 operatively coupled to the processing apparatus 158. The processing apparatus 158 may be configured to turn on the generator 142, monitor a status of the generator, or control power delivery of the generator. For example, the processing apparatus 158 may be configured to provide power to imaging devices 150 using the generator 142.

The demolition system 100 may additionally include a pump 172 operatively coupled to the processing apparatus 158. The pump 172 may receive signals or commands from the processing apparatus 158. Commands may include, for example, to pump water to the spray nozzle 154 via tube 152. The pump 172 may include any suitable components to pump water. The pump 172 may include, for example, a housing, a hub, a bearing, a seal, an impeller, etc. The pump 172 may receive water from the water reservoir 108 via supply tube 133. The pump 172 may be powered by the generator 142 or a fuel source of the demolition apparatus 106.

The demolition system 100 may additionally include a motor 134 operatively coupled to the processing apparatus 158. The motor 134 may receive signals or commands from the processing apparatus 158. Commands may include, for example, to move the demolition apparatus 106, to move the arm 130, to move the gripping members 132, to move the movable outriggers 120, to move the extendable tail 153, to pump water to the spray nozzle 154, to move the imaging devices 150, etc.

The demolition system 100 may additionally include one or more sensors 170 operatively coupled to the processing apparatus 158. The one or more sensors 170 may include temperature sensors, altimeters, proximity sensors, pressure sensors, etc. The one or more sensors 170 may be configured to sense various aspects of the demolition system 100 and provide signals representative of the sensed aspects to the processing apparatus 158. Accordingly, the processing apparatus 158 can monitor the demolition system 100 and provide the signals or feedback to a user via transmitter 168.

Further, the processing apparatus 158 includes data storage 160. Data storage 160 allows for access to processing programs or routines 162 and one or more other types of data 164 that may be employed to carry out the exemplary techniques, processes, and algorithms of demolishing a structure using the demolition system 100 and controlling the various components (e.g., the motor, the transmitter 168, the sensors 170, etc.) of the demolition system 100 based on received commands. For example, processing programs or routines 162 may include programs or routines for performing outrigger movement, demolition apparatus movement, arm movement, gripping member movement, pump control, sensor data analysis, computational mathematics, matrix mathematics, Fourier transforms, compression algorithms, calibration algorithms, image construction algorithms, inversion algorithms, signal processing algorithms, normalizing algorithms, deconvolution algorithms, averaging algorithms, standardization algorithms, comparison algorithms, vector mathematics, or any other processing required to implement one or more embodiments as described herein.

Data 164 may include, for example, commands, movement limits (e.g., the rotation zone 157 of FIG. 3), thresholds, water flow/pump settings, outrigger angles, outrigger pressure, arrays, meshes, grids, variables, counters, statistical estimations of accuracy of results, results from one or more processing programs or routines employed according to the disclosure herein (e.g., current angle of the arm, position of the movable outriggers, etc.), or any other data that may be necessary for carrying out the one or more processes or techniques described herein.

In one or more embodiments, the demolition system 100 may be controlled using one or more computer programs executed on programmable computers, such as computers that include, for example, processing capabilities (e.g., microcontrollers, programmable logic devices, etc.), data storage (e.g., volatile or non-volatile memory and/or storage elements), input devices, and output devices. Program code and/or logic described herein may be applied to input data to perform functionality described herein and generate desired output information. The output information may be applied as input to one or more other devices and/or processes as described herein or as would be applied in a known fashion.

The programs used to implement the processes described herein may be provided using any programmable language, e.g., a high-level procedural and/or object orientated programming language that is suitable for communicating with a computer system. Any such programs may, for example, be stored on any suitable device, e.g., a storage media, readable by a general or special purpose program, computer or a processor apparatus for configuring and operating the computer when the suitable device is read for performing the procedures described herein. In other words, at least in one embodiment, the demolition system 100 may be controlled using a computer readable storage medium, configured with a computer program, where the storage medium so configured causes the computer to operate in a specific and predefined manner to perform functions described herein.

The processing apparatus 158 may be, for example, any fixed or mobile computer system (e.g., a personal computer or minicomputer). The exact configuration of the computing apparatus is not limiting and essentially any device capable of providing suitable computing capabilities and control capabilities (e.g., control the sound output of the demolition system 100, the acquisition of data, such as audio data or sensor data) may be used. Further, various peripheral devices, such as a computer display, mouse, keyboard, memory, printer, scanner, etc. are contemplated to be used in combination with the processing apparatus 158. Further, in one or more embodiments, the data 164 (e.g., commands, movement limits, thresholds, water flow/pump settings, outrigger angles, etc.) may be analyzed by a user, used by another machine that provides output based thereon, etc. As described herein, a digital file may be any medium (e.g., volatile or non-volatile memory, a CD-ROM, a punch card, magnetic recordable tape, etc.) containing digital bits (e.g., encoded in binary, trinary, etc.) that may be readable and/or writeable by processing apparatus 158 described herein. Also, as described herein, a file in wearer-readable format may be any representation of data (e.g., ASCII text, binary numbers, hexadecimal numbers, decimal numbers, audio, graphical) presentable on any medium (e.g., paper, a display, sound waves, etc.) readable and/or understandable by a wearer.

In view of the above, it will be readily apparent that the functionality as described in one or more embodiments according to the present disclosure may be implemented in any manner as would be known to one skilled in the art. As such, the computer language, the computer system, or any other software/hardware that is to be used to implement the processes described herein shall not be limiting on the scope of the systems, processes or programs (e.g., the functionality provided by such systems, processes or programs) described herein.

The techniques described in this disclosure, including those attributed to the systems, or various constituent components, may be implemented, at least in part, in hardware, software, firmware, or any combination thereof. For example, various aspects of the techniques may be implemented by the processing apparatus 158, which may use one or more processors such as, e.g., one or more microprocessors, DSPs, ASICs, FPGAs, CPLDs, microcontrollers, or any other equivalent integrated or discrete logic circuitry, as well as any combinations of such components, image processing devices, or other devices. The term "processing apparatus," "processor," or "processing circuitry" may generally refer to any of the foregoing logic circuitry, alone or in combination with other logic circuitry, or any other equivalent circuitry. Additionally, the use of the word "processor" may not be limited to the use of a single processor but is intended to connote that at least one processor may be used to perform the exemplary techniques and processes described herein.

Such hardware, software, and/or firmware may be implemented within the same device or within separate devices to support the various operations and functions described in this disclosure. In addition, any of the described components may be implemented together or separately as discrete but interoperable logic devices. Depiction of different features, e.g., using block diagrams, etc., is intended to highlight different functional aspects and does not necessarily imply that such features must be realized by separate hardware or software components. Rather, functionality may be performed by separate hardware or software components, or integrated within common or separate hardware or software components. For example, the receiver 166 and transmitter 168 may both be part of a transceiver.

When implemented in software, the functionality ascribed to the systems, devices and techniques described in this disclosure may be embodied as instructions on a computer-readable medium such as RAM, ROM, NVRAM, EEPROM, FLASH memory, magnetic data storage media, optical data storage media, or the like. The instructions may be executed by the processing apparatus 158 to support one or more aspects of the functionality described in this disclosure.

Figure 5:
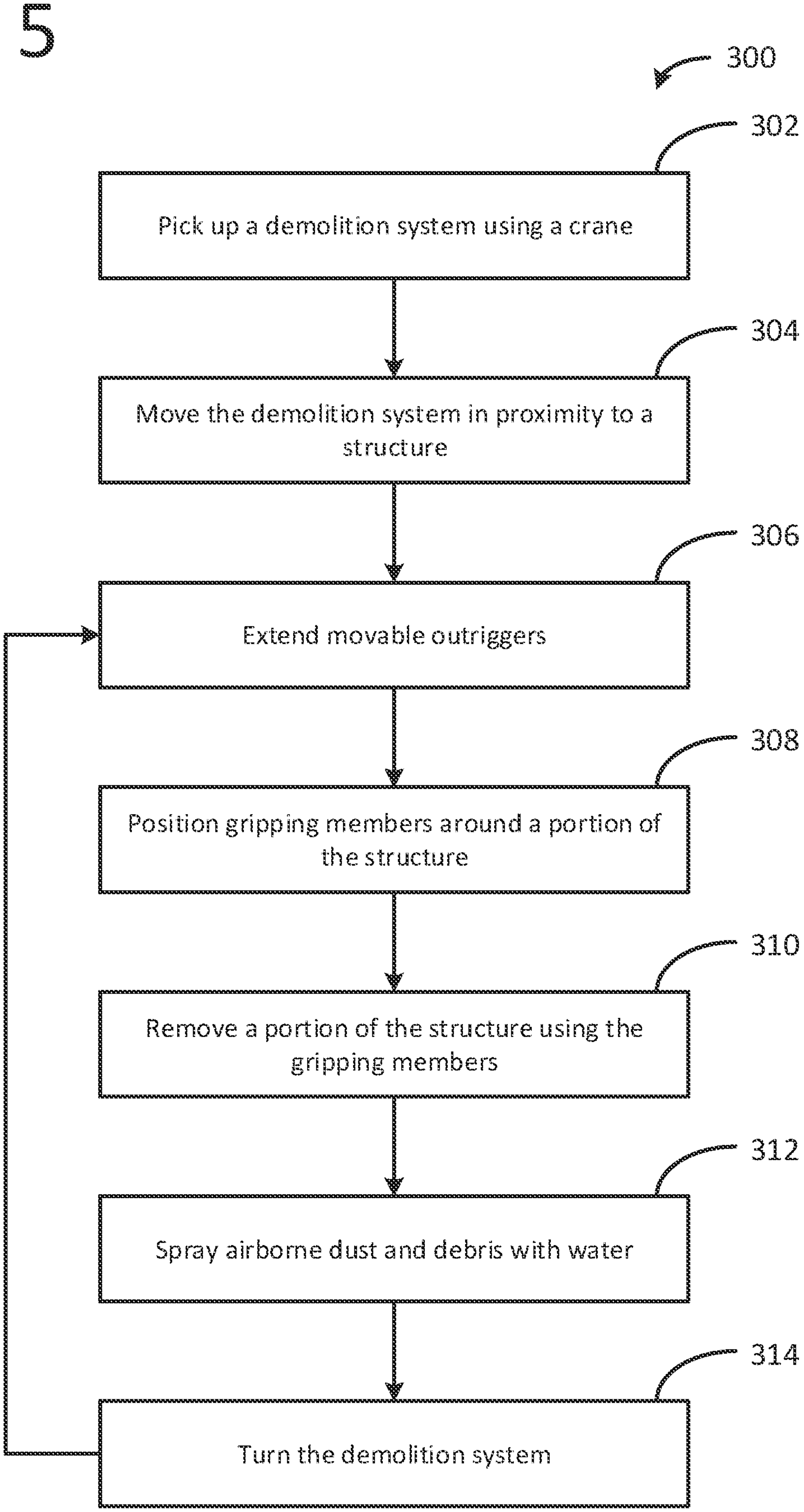
FIG. 5 shows a flow chart for a method or process of demolishing a structure using a demolition system according to embodiments described herein.

FIG. 5 depicts a flow diagram of a method or process 300 for demolishing a structure using the demolition system 100. Although described in regard to demolition system 100 of FIGS. 1-4, the method 300 can be utilized with any suitable demolition system. The method 300 may include picking up a demolition system 100 using a crane 200 at 302. The demolition system 100 may be operatively coupled to the crane 200 via lifting ears 116. The lifting ears 116 may support the weight of the demolition system 100 as the demolition system is lifted by the crane 200.

The method 300 may include moving the demolition system 100 in proximity to a structure 202 using the crane 200 at 304. In other words, the crane 200 may move the demolition system 100 close enough to the structure 202 to engage one or more walls of the structure with movable outriggers 120 and/or grip the structure with gripping members 132. Moving the demolition system 100 in proximity to the structure 202 may place at least a portion of the structure within the rotation zone 157.

The method 300 may include extending the movable outriggers 120 to engage the structure 202 using a motor 134 of a demolition apparatus 106 of the demolition system 100 at 306. The motor 134 may control hydraulics of the movable outriggers 120 to extend (or retract) the movable outriggers 120. The movable outriggers 120 may engage with the structure to allow movement of the demolition apparatus 106 while keeping the frame 102 of the demolition system 100 stationary. Engagement of the movable outriggers 120 with the structure 202 may cause extendable outriggers 118 of the demolition system 100 to also engage with the structure 202. In other words, the movable outriggers 120 may push against a wall or portion of the structure 202 causing the frame 102 to move away from such portion until the extendable outriggers 118 engage with another portion of the structure 202. Thus, the frame 102 may be held firmly in place while the demolition apparatus is free to move and rotate.

The method 300 may include positioning gripping members 132 around a portion of the structure 202 at 308. Positioning the gripping members 132 may include rotating the demolition apparatus 106, moving an arm 130 of the demolition apparatus, and/or moving the gripping members 132. Rotation and movement of the demolition apparatus 106, arm 130, and gripping members 132 may be facilitated by the motor 134.

The method 300 may include removing a portion of the structure 202 using the gripping members 132 at 310. Removing the portion of the structure 202 may include clamping or gripping the portion with the gripping members 132 and moving the arm 130 and/or rotating the demolition apparatus 106 to dislodge the portion from the structure. The arm 130 and rotation of the demolition apparatus 106 may be facilitated by the motor 134 of the demolition apparatus 106.

The method 300 may include spraying airborne dust and debris with water using a spray nozzle 154 operatively coupled to the demolition apparatus 106 at 312. The demolition apparatus 106 may pump water received from a water reservoir 108 to the spray nozzle 154 via a tube 152. The sprayed water may inhibit the propagation of airborne dust and debris in the air. Accordingly, the spread of dust and debris can be minimized.

The method 300 may further include turning the demolition system 100 to face another portion of the structure 202 at 314. To turn the demolition system 100, the movable outriggers 120 may be retracted and disengaged from the structure 202 allowing the allowing the demolition system 100 to be turned. Once the movable outriggers 120 are disengaged from the structure 202, the gripping members 132 may be used to grip a portion of the structure 202 while the demolition apparatus 106 rotates causing the demolition system 100 to turn or rotate. The gripping members 132 may release the structure 202 and the demolition apparatus 106 rotated to allow the gripping members 132 to grip a different portion of the structure 202 while the demolition apparatus 106 rotates again. These steps may be repeated until the demolition system 100 is facing a desired portion of the structure 202. The method 300 may return to step 306 to continue demolishing the structure 202. Accordingly, the demolition apparatus 100 can be rotated to demolish and entire diameter or perimeter of the structure 202. Additionally, the crane 200 can lower or lift the demolition system 100 to allow the demolition system 100 to demolish the structure at any vertical location.

The invention claimed is:

1. A demolition system comprising:
- a frame comprising:
  - a frame base;
  - a plurality of support members coupled to the frame base, wherein two support members of the plurality of support members define an angle of rotation of a rotation zone;
  - a platform coupled to the plurality of support members, the platform supported above the frame base by the plurality of support members; and
  - one or more lifting ears extending from the platform, each of the one or more lifting ears comprising one or more lifting points, wherein the one or more lifting ears are configured to support a weight of the system when the system is lifted via the one or more lifting ears;
- a plurality of outriggers coupled to the frame base;
- a demolition apparatus coupled to and supported by the frame base of the frame, the demolition apparatus comprising:
  - a main body rotatably coupled to the frame base;
  - an arm extending from the main body between the two support members and moveable within the rotation zone, wherein the rotation zone is defined by the angle of rotation and a maximum extension length of the arm;
  - one or more gripping members coupled to an end of the arm; and
  - a motor configured to selectively rotate the main body relative to the frame base; and
- a water reservoir coupled to and supported by the platform of the frame, the water reservoir comprising a storage volume configured to hold water, wherein the water reservoir is in fluid communication with the demolition apparatus, and wherein the water reservoir is configured provide the water to the demolition apparatus.

2. The system of claim 1, wherein the water reservoir is configured to passively provide water to the demolition apparatus.

3. The system of claim 1, wherein the demolition apparatus further comprises:
- a spray nozzle coupled to the arm; and
- a pump configured to pump water to the spray nozzle.

4. The system of claim 1, further comprising a tube configured to convey water from the water reservoir to the demolition apparatus.

5. The system of claim 1, wherein the water reservoir comprises a housing defining the storage volume, and wherein the housing is at least partially transparent or semitransparent.

6. The system of claim 1, wherein the plurality of outriggers comprises two movable outriggers configured to extend and retract.

7. The system of claim 6, wherein the motor of the demolition apparatus is further configured to extend or retract the two movable outriggers.

8. The system of claim 6, wherein each of the two movable outriggers comprises a hydraulic motor.

9. The system of claim 8, wherein the two movable outriggers are configured to retract in response to the demolition system losing power.

10. The system of claim 1, wherein the plurality of outriggers comprises to extendable outriggers configured to couple to outrigger extensions.

11. The system of claim 1, wherein the plurality of outriggers are configured to:
- engage with one or more walls; and
- remain stationary while engaged to the one or more walls while the demolition apparatus rotates.

12. The system of claim 1, further comprising a receiver configured to receive commands from an external control system.

13. The system of claim 1, further comprising a transmitter configured to transmit system data of the system to an external computing device.

14. The system of claim 1, further comprising one or more imaging devices configured to capture images within a demolition zone.

15. The system of claim 14, wherein at least one imaging device of the one or more imaging devices is configured to capture images within the rotation zone.

16. The system of claim 1, wherein the one or more lifting points comprise a through-hole extending through one of the one or more lifting ears.

17. The system of claim 1, wherein the angle of rotation is greater than or equal to 90 degrees and less than or equal to 180 degrees.

18. The system of claim 1, wherein the platform overhangs and extends beyond the frame base in at least one direction.

19. The system of claim 1, further comprising:

an audio-visual cord; and an extendable tail coupled to the platform configured to hold the audio-visual cord away from structures within a demolition zone.

20. The system of claim 1, further comprising a plurality of pins configured to couple the plurality of support members to the frame base or platform, wherein each of the plurality of pins are removable and the support members are separable from the frame base and the platform when the plurality of pins are removed.

* * * * *